United States Patent
Zhang

(10) Patent No.: US 9,665,284 B2
(45) Date of Patent: May 30, 2017

(54) PARTITION EXTENSION METHOD AND APPARATUS

(71) Applicant: Huawei Technologies Co., Ltd., Shenzhen (CN)

(72) Inventor: Feng Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 125 days.

(21) Appl. No.: 14/752,068

(22) Filed: Jun. 26, 2015

(65) Prior Publication Data

US 2015/0293707 A1   Oct. 15, 2015

Related U.S. Application Data

(63) Continuation of application No. PCT/CN2012/087743, filed on Dec. 27, 2012.

(51) Int. Cl.
*G06F 12/02* (2006.01)
*G06F 3/06* (2006.01)

(52) U.S. Cl.
CPC ............ *G06F 3/0607* (2013.01); *G06F 3/067* (2013.01); *G06F 3/0629* (2013.01);
(Continued)

(58) Field of Classification Search
CPC .... G06F 3/0607; G06F 3/0644; G06F 3/0647; G06F 3/067; G06F 12/0223;
(Continued)

(56) References Cited

U.S. PATENT DOCUMENTS

2010/0058013 A1* 3/2010 Gelson ................ G06F 11/1453
  711/162
2010/0106934 A1  4/2010 Calder et al.
(Continued)

FOREIGN PATENT DOCUMENTS

CN  101374087 A  2/2009
CN  102043726 A  5/2011
(Continued)

OTHER PUBLICATIONS

Foreign Communication From a Counterpart Application, Korean Application No. 10-2015-7017725, Korean Office Action dated May 4, 2016, 5 pages.
(Continued)

*Primary Examiner* — Gary Portka
(74) *Attorney, Agent, or Firm* — Huawei Technologies Co., Ltd.

(57) ABSTRACT

In a distributed storage system, a method for extending a number N of data node devices comprises a server receives an instruction of adding X new data nodes into the distributed storage system. Then, the server obtains a number M of the all partitions included in a hash ring and determines that M/(N+X) is lower than a preset threshold. The hash ring is organized according to a distributed hash table (DHT), and includes a plurality of partitions. Each partition is mapping to a data node. Based upon the determination, the server generates new partitions by multiplying partitions mapping to each data node, based upon the determination. After storing mapping relationship between the new partitions and the X new data nodes, the server adds the X new data nodes into the distributed storage system.

9 Claims, 3 Drawing Sheets

(52) U.S. Cl.
CPC ........ G06F 3/0644 (2013.01); G06F 12/0223 (2013.01); *G06F 2212/1048* (2013.01); *G06F 2212/152* (2013.01); *G06F 2212/154* (2013.01); *G06F 2212/254* (2013.01); *G06F 2212/261* (2013.01); *G06F 2212/263* (2013.01)

(58) Field of Classification Search
CPC ......... G06F 12/0646; G06F 2212/1048; G06F 2212/152; G06F 2212/154; G06F 2212/254; G06F 2212/261; G06F 2212/263
USPC .............................................. 711/5, 173, 209
See application file for complete search history.

(56) References Cited

U.S. PATENT DOCUMENTS

| | | | |
|---|---|---|---|
| 2010/0235606 A1* | 9/2010 | Oreland .............. | G06F 17/3033 711/173 |
| 2010/0312749 A1* | 12/2010 | Brahmadesam .... | H04L 67/1097 707/609 |
| 2012/0109918 A1 | 5/2012 | Nishiyama | |
| 2012/0323852 A1 | 12/2012 | Jain et al. | |

FOREIGN PATENT DOCUMENTS

| | | |
|---|---|---|
| CN | 102591970 A | 7/2012 |
| JP | 4362839 B1 | 11/2009 |
| JP | 20090295127 A | 12/2009 |
| JP | 2012507086 A | 3/2012 |
| JP | 20120123790 A | 6/2012 |
| WO | 2012000348 A1 | 1/2012 |
| WO | 2012164735 A1 | 12/2012 |

OTHER PUBLICATIONS

Foreign Communication From a Counterpart Application, Korean Application No. 10-2015-7017725, English Translation of Korean Office Action dated May 4, 2016, 3 pages.
Foreign Communication From a Counterpart Application, Japanese Application No. 2015-549922, Japanese Notice of Allowance dated Sep. 6, 2016, 3 pages.
Partial English Translation and Abstract of Chinese Patent Application No. CN102043726A, Jun. 8, 2015, 5 pages.
Partial English Translation and Abstract of Chinese Patent Application No. CN102591970A, Jun. 8, 2015, 7 pages.
Foreign Communication From a Counterpart Application, Chinese Application No. 201280002874.X, Chinese Office Action dated Apr. 3, 2015, 8 pages.
Foreign Communication From a Counterpart Application, PCT Application No. PCT/CN2012/087743, English Translation of International Search Report dated Oct. 3, 2013, 2 pages.
Foreign Communication From a Counterpart Application, PCT Application No. PCT/CN2012/087743, English Translation of Written Opinion dated Oct. 3, 2013, 8 pages.
Foreign Communication From a Counterpart Application, European Application No. 12890935.5, Extended European Search Report dated Nov. 10, 2015, 6 pages.

* cited by examiner

PARTITION EXTENSION METHOD AND APPARATUS

CROSS-REFERENCE TO RELATED APPLICATIONS

This application is a continuation of International Application No. PCT/CN2012/087743, filed on 27 Dec. 2012, which is hereby incorporated by reference in its entirety.

TECHNICAL FIELD

The present invention relates to the field of storage technologies, and in particular, to a partition extension method and apparatus.

BACKGROUND

In a distributed storage system, a distributed hash table (DHT) is generally used to determine a storage position of data. That is, a Hash value is calculated by using a hash function, and data is mapped to Hash space according to the Hash value, where the Hash space is a ring connected head-to-tail. A Hash ring may be divided into several equal parts, each part is referred to as a partition, and the partitions are equally distributed to physical nodes. In addition, a mapping relationship between data and a partition is established and a mapping relationship between a partition and a physical node is established and stored in the DHT. Data read and write, capacity expansion of a distributed cluster, troubleshooting, and the like all depend on a change of the DHT. Therefore, the DHT needs to achieve an objective that load is even, reliability is good, a storage manner of data on a node facilitates data migration, and expansibility is good (that is, capacity expansion may be performed for multiple times for a system).

In the prior art, system capacity expansion may be implemented by adding a new physical node in the distributed storage system, that is, by increasing a quantity of physical nodes. A specific capacity expansion method may include: adding a new physical node into the system moving a partition that is in an original physical node to the new physical node, to perform and capacity expansion of the distributed storage system. Quantities of partitions in physical nodes are roughly the same.

During a process of implementing the foregoing system capacity expansion, the prior art has at least the following problems: if capacity expansion is performed for the distributed storage system for multiple times, a quantity of partitions in a physical node is decreasing, and the system capacity expansion is affected (for example, when there are only four partitions in each physical node, a capacity of the system can only be expanded to a maximum of four times an original capacity), which causes poor expansibility of the distributed storage system.

SUMMARY

Embodiments of the present invention provide a partition extension method and apparatus, so that a quantity of partitions in a physical node can be increased during capacity expansion of a distributed storage system, thereby ensuring expansibility of the distributed storage system.

To achieve the foregoing objectives, the embodiments of the present invention adopt the following technical solutions:

A first aspect of the embodiments of the present invention provides a partition extension method, including acquiring an average value of quantities of partitions in all physical nodes in a distributed storage system; if the average value of the quantities of the partitions is less than a preset threshold, performing multiplication on a quantity of partitions in each physical node; and adding a mapping relationship between a newly added partition and a physical node in which the newly added partition is located into a pre-stored distributed hash table (DHT).

With reference to the first aspect, in a possible implementation manner, after the performing multiplication on a quantity of partitions in each physical node, the method further includes acquiring a hash value of data in each partition in each physical node; acquiring a modulus value that is obtained by performing modulo operation on the hash value of the data and a quantity that is obtained after extension and is of partitions in the physical node in which the data is located; and determining, according to the modulus value of the data, a destination partition to which the data is to be migrated; and if the destination partition is different from the partition in which the data is currently located, migrating the data to the destination partition.

With reference to the first aspect or the foregoing possible implementation manner, in another possible implementation manner, the performing multiplication on a quantity of partitions in each physical node includes multiplying the quantity of the partitions in each physical node to at least two times the quantity of the partitions.

With reference to the first aspect, in another possible implementation manner, after adding a mapping relationship between a new partition corresponding to the partition and a physical node in which the partition is located into a pre-stored distributed hash table (DHT), the method further includes acquiring an average value of quantities that are obtained after extension and are of partitions in all the physical nodes in the distributed storage system; and if the average value of the quantities of the partitions after extension is less than the preset threshold, performing multiplication on the quantity of the partitions in each physical node again, where times for multiplication each time are the same.

With reference to the first aspect and the foregoing possible implementation manners, in another possible implementation manner, acquiring an average value of quantities of partitions in all physical nodes in a distributed storage system includes periodically acquiring the average value of the quantities of the partitions in all the physical nodes in the distributed storage system; or responding to a trigger instruction of a user, to acquire the average value of the quantities of the partitions in all the physical nodes in the distributed storage system.

A second aspect of the embodiments of the present invention further provides a partition extension apparatus, including a first acquiring unit configured to acquire an average value of quantities of partitions in all physical nodes in a distributed storage system; a first multiplying unit configured to: if the average value of the quantities of the partitions is less than a preset threshold, perform multiplication on a quantity of partitions in each physical node; and a mapping unit configured to add a mapping relationship between a newly added partition and a physical node in which the newly added partition is located into a pre-stored distributed hash table DHT.

With reference to the second aspect, in a possible implementation manner, the partition extension apparatus further includes: a second acquiring unit configured to: after the first multiplying unit performs multiplication on the quantity of the partitions in each physical node, acquire a hash value of data in each partition in each physical node; a third acquiring unit configured to acquire a modulus value that is obtained by performing modulo operation on the hash value of the data and a quantity that is obtained after extension and is of partitions in the physical node in which the data is located; and a migrating unit configured to determine, according to the modulus value of the data, a destination partition to which the data is to be migrated, and if the destination partition is different from the partition in which the data is currently located, migrate the data to the destination partition.

With reference to the second aspect or the foregoing possible implementation manner, in another possible implementation manner, the first multiplying unit is further configured to multiply the quantity of the partitions in each physical node to at least two times the quantity of the partitions.

With reference to the second aspect, in another possible implementation manner, the partition extension apparatus further includes a fourth acquiring unit configured to: after the mapping unit adds the mapping relationship between the newly added partition and the physical node in which the newly added partition is located into the pre-stored distributed hash table (DHT), acquire an average value of quantities that are obtained after extension and are of the partitions in all the physical nodes in the distributed storage system; and a second multiplying unit configured to: if the average value of the quantities of the partitions after extension is less than the preset threshold, perform multiplication on the quantity of the partitions in each physical node again, where times for multiplication each time are the same.

With reference to the second aspect, in another possible implementation manner, the first acquiring unit is further configured to periodically acquire the average value of the quantities of the partitions in all the physical nodes in the distributed storage system; or respond to a trigger instruction of a user, to acquire the average value of the quantities of the partitions in all the physical nodes in the distributed storage system.

A third aspect of the embodiments of the present invention further provides a partition extension apparatus, including a processor configured to acquire an average value of quantities of partitions in all physical nodes in a distributed storage system; if the average value of the quantities of the partitions is less than a preset threshold, perform multiplication on a quantity of partitions in each physical node; and add a mapping relationship between a newly added partition and a physical node in which the newly added partition is located into a pre-stored distributed hash table (DHT); and a memory configured to store the mapping relationship between the newly added partition and the physical node in which the newly added partition is located that is added by the processor.

With reference to the third aspect, in a possible implementation manner, the processor is further configured to acquire a hash value of data in each partition in each physical node; acquire a modulus value that is obtained by performing modulo operation on the hash value of the data and a quantity that is obtained after extension and is of partitions in the physical node in which the data is located; and determine, according to the modulus value of the data, a destination partition to which the data is to be migrated, and if the destination partition is different from the partition in which the data is currently located, migrate the data to the destination partition.

With reference to the second aspect, in another possible implementation manner, the processor is further configured to multiply the quantity of the partitions in each physical node to at least two times the quantity of the partitions.

With reference to the second aspect, in another possible implementation manner, the processor is further configured to: after the mapping relationship between the new partition corresponding to the partition and the physical node in which the partition is located is added into the DHT, acquire an average value of quantities that are obtained after extension and are of partitions in all the physical nodes in the distributed storage system; and if the average value of the quantities of the partitions after extension is less than the preset threshold, perform multiplication on the quantity of the partitions in each physical node again, where times for multiplication each time are the same.

With reference to the second aspect, in another possible implementation manner, the processor is further configured to periodically acquire the average value of the quantities of the partitions in all the physical nodes in the distributed storage system; or respond to a trigger instruction of a user, to acquire the average value of the quantities of the partitions in all the physical nodes in the distributed storage system.

With the partition extension method and apparatus provided in the embodiments of the present invention, an average value of quantities of partitions in all physical nodes in a distributed storage system can be acquired; if the average value of the quantities of the partitions is less than a preset threshold, multiplication can be performed on a quantity of partitions in each physical node; and a mapping relationship between a newly added partition and a physical node in which the newly added partition is located can be added into a pre-stored distributed hash table (DHT). Compared with the prior art in which expansibility of a distributed storage system is poor due to a small quantity of partitions in a physical node, with the partition extension method and apparatus provided in the embodiments of the present invention, if a quantity of partitions is less than a preset threshold, multiplication on the quantity of the partitions can be performed during capacity expansion of the distributed storage system, thereby ensuring expansibility of the distributed storage system.

BRIEF DESCRIPTION OF DRAWINGS

To describe the technical solutions in the embodiments of the present invention more clearly, the following briefly introduces the accompanying drawings required for describing the embodiments.

DESCRIPTION OF EMBODIMENTS

The following clearly describes the technical solutions in the embodiments of the present invention with reference to the accompanying drawings in the embodiments of the present invention.

Embodiment 1

Figure 1:
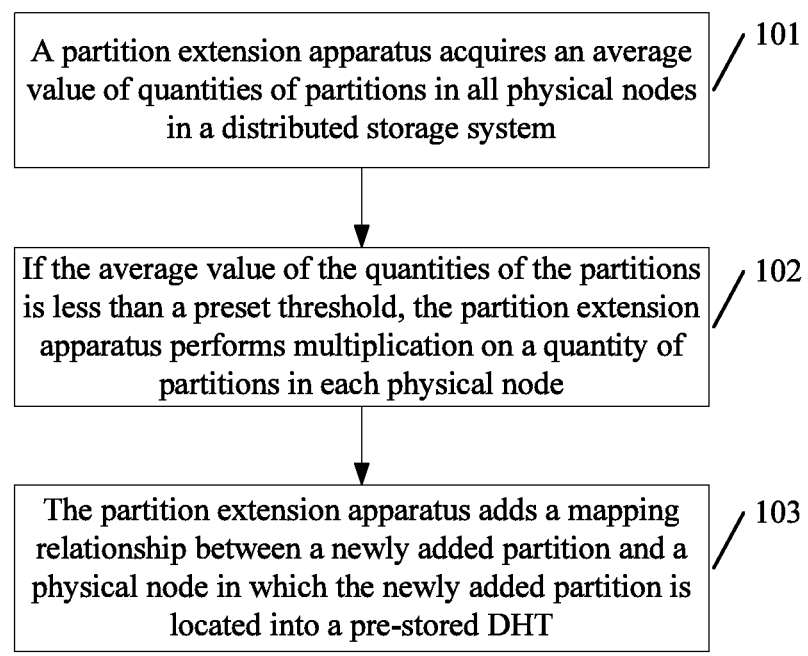
FIG. 1 is a flowchart of a partition extension method according to Embodiment 1 of the present invention.

An embodiment of the present invention provides a partition extension method. As shown in FIG. 1, the method includes the following steps:

101. A partition extension apparatus acquires an average value of quantities of partitions in all physical nodes in a distributed storage system.

When using a distributed hash table (DHT) to store data, the distributed storage system can calculate, according to a data identifier of different data and by using a hash function, a hash value (Hash) that is of the data and corresponds to the data identifier. The data is mapped to hash space according to the hash value, where the hash space is circular space connected head-to-tail. A hash ring may be divided into several equal parts, each part is referred to as a partition, and the partitions are equally distributed to physical nodes. A physical node may be a physical address of the distributed storage system. The distributed storage system may divide physical addresses of the distributed storage system into multiple address segments, and each segment of physical addresses is a physical node.

A method for acquiring, by the partition extension apparatus, the average value of the quantities of the partitions in the physical nodes in the distributed storage system may include: periodically acquiring, by the partition extension apparatus, the average value of the quantities of the partitions in all the physical nodes in the distributed storage system; or responding, by the partition extension apparatus, to a trigger instruction of a user, to acquire the average value of the quantities of the partitions in all the physical nodes in the distributed storage system. Specifically, the partition extension apparatus may preset an acquiring period, and spontaneously acquire the average value of the quantities of the partitions in all the physical nodes in the distributed storage system according to the period; or when performing capacity expansion of the distributed storage system, the partition extension apparatus receives the trigger instruction of the user and responds to the trigger instruction, to acquire the average value of the quantities of the partitions in all the physical nodes in the distributed storage system.

102. If the average value of the quantities of the partitions is less than a preset threshold, the partition extension apparatus performs multiplication on a quantity of partitions in each physical node.

The preset threshold may be set to a value that satisfies the average value of the quantities of the partitions in all the physical nodes in the distributed storage system when capacity expansion is performed for the distributed storage system at least once.

After the partition extension apparatus performs multiplication on the quantity of the partitions in each physical node, the method in this embodiment of the present invention further includes: acquiring, by the partition extension apparatus, a hash value of data in each partition in each physical node; acquiring, by the partition extension apparatus, a modulus value that is obtained by performing modulo operation on the hash value of the data and a quantity that is obtained after extension and is of partitions in the physical node in which the data is located; and determining, by the partition extension apparatus according to the modulus value of the data, a destination partition to which the data is to be migrated, and if the destination partition is different from the partition in which the data is currently located, migrating, by the partition extension apparatus, the data to the destination partition.

103. The partition extension apparatus adds a mapping relationship between a newly added partition and a physical node in which the newly added partition is located into a pre-stored DHT.

In the distributed storage system, the DHT may be used to determine a storage position of data. That is, the DHT may store a mapping relationship between a data identifier and a partition and a mapping relationship between a partition and a physical node. Therefore, after performing multiplication on the quantity of the partitions in each physical node, the partition extension apparatus further needs to add the mapping relationship between the newly added partition and the physical node in which the newly added partition is located into the pre-stored DHT.

In the partition extension method provided in this embodiment of the present invention, an average value of quantities of partitions in all physical nodes in a distributed storage system can be acquired; if the average value of the quantities of the partitions is less than a preset threshold, multiplication can be performed on a quantity of partitions in each physical node; and a mapping relationship between a newly added partition and a physical node in which the newly added partition is located can be added into a pre-stored distributed hash table (DHT). Compared with the prior art in which expansibility of a distributed storage system is poor due to a small quantity of partitions in a physical node, in the partition extension method provided in this embodiment of the present invention, if a quantity of partitions is less than a preset threshold, multiplication on the quantity of the partitions can be performed during capacity expansion of the distributed storage system, thereby ensuring expansibility of the distributed storage system.

Embodiment 2

Figure 2:
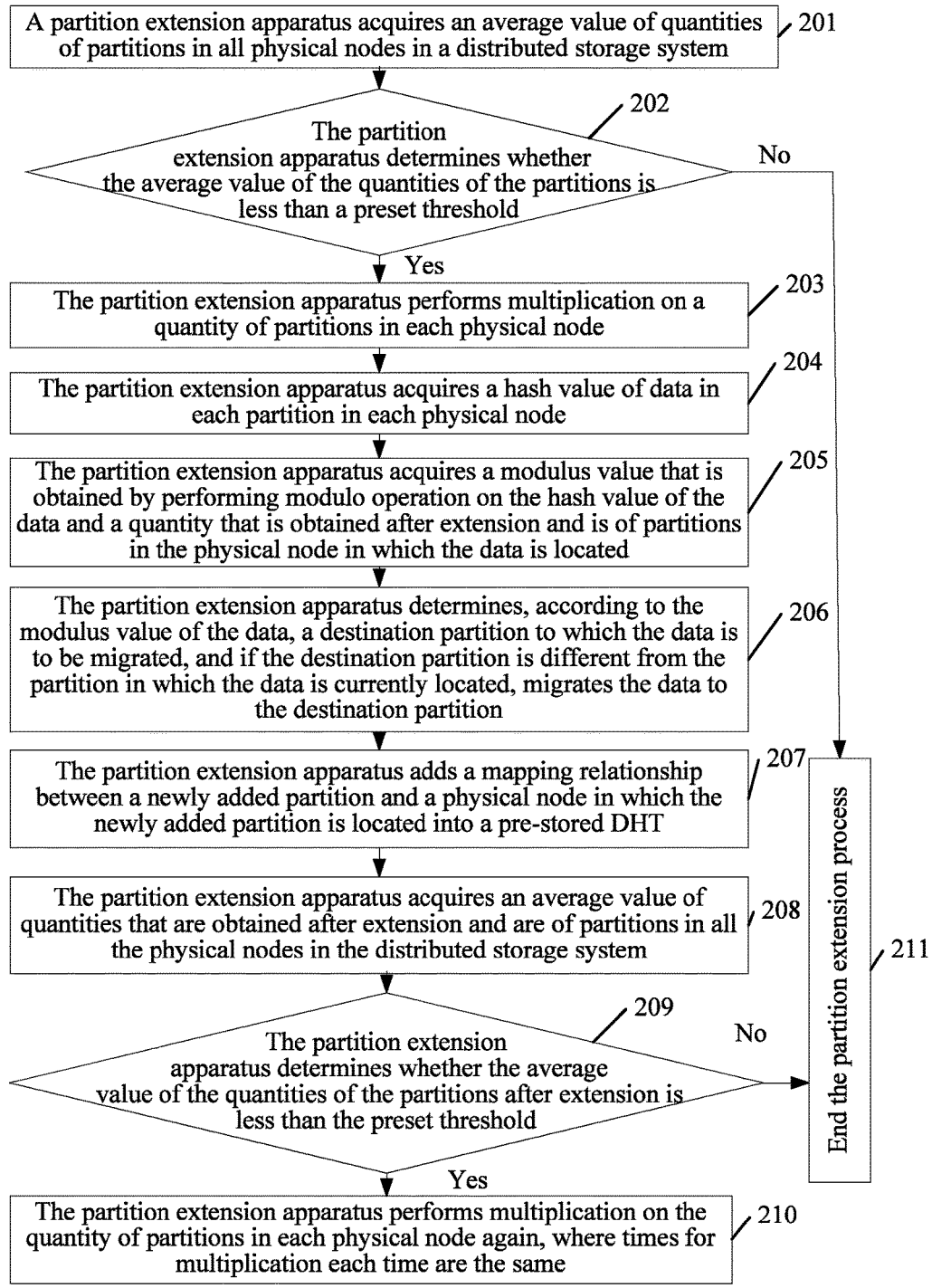
FIG. 2 is a flowchart of a partition extension method according to Embodiment 2 of the present invention.

An embodiment of the present invention provides a partition extension method. As shown in FIG. 2, the method includes the following steps:

201. A partition extension apparatus acquires an average value of quantities of partitions in all physical nodes in a distributed storage system.

Exemplarily, a method for acquiring, by the partition extension apparatus, the average value of the quantities of the partitions in all the physical nodes in the distributed storage system may be specifically as follows: the partition extension apparatus queries, in a pre-stored DHT, a quantity of the physical nodes in the distributed storage system and a total quantity of the partitions in all the physical nodes; and the partition extension apparatus calculates the average value of the quantities of the partitions in the physical nodes according to the quantity of the physical nodes and the total quantity of the partitions in all the physical nodes.

The quantity of the physical nodes is a total quantity of the physical nodes in the distributed storage system. The method for calculating, by the partition extension apparatus, the average value of the quantities of the partitions in the physical nodes according to the quantity of the physical nodes and the total quantity of the partitions in all the physical nodes may be specifically as follows: using a quotient that is obtained by the partition extension apparatus by dividing the total quantity of the partitions in all the physical nodes by the quantity of the physical nodes as the average value of the quantities of the partitions in the physical nodes. For example, if the quantity of the physical nodes is A, the total quantity of the partitions in all the physical nodes is B, and the average value of the quantities of the partitions in the physical nodes is C, the quantity of the physical nodes, the total quantity of the partitions in all the physical nodes, and the average value of the quantities of the partitions in the physical nodes should meet a formula C=A/B.

Further, in an application scenario of this embodiment, when the distributed storage system uses the DHT to store data, the quantities of the partitions in the physical nodes are roughly the same. Therefore, the partition extension apparatus may also query, in the pre-stored DHT, a quantity of partitions in any physical node in the distributed storage system, and use the quantity of the partitions in the physical node as the average value of the quantities of the partitions in all the physical nodes in the distributed storage system.

202. The partition extension apparatus determines whether the average value of the quantities of the partitions is less than a preset threshold; if the average value of the quantities of the partitions is less than the preset threshold, perform step 203; or if the average value of the quantities of the partitions is not less than the preset threshold, perform step 211.

203. The partition extension apparatus performs multiplication on a quantity of partitions in each physical node.

That the partition extension apparatus performs multiplication on a quantity of partitions in each physical node may include: multiplying, by the partition extension apparatus, the quantity of the partitions in each physical node to at least two times the quantity of the partitions.

Specifically, the partition extension apparatus may modify the quantity of the partitions in each physical node in the pre-stored DHT to at least two times the quantity of the partitions in each physical node.

It should be noted that, generally, when the partition extension apparatus performs multiplication on the quantity of the partitions in each physical node, times for the multiplication on the quantity of the partitions are 2. The partition extension apparatus may also perform extension by three times or even more times on the quantity of the partitions in each physical node. That the partition extension apparatus performs extension by two times on the quantity of the partitions in each physical node is used as an example in this embodiment of the present invention. However, the times for the multiplication performed by the partition extension apparatus on the quantity of the partitions in each physical node is not limited.

204. The partition extension apparatus acquires a hash value of data in each partition in each physical node.

Specifically, the partition extension apparatus may query, in the pre-stored DHT and according to an identifier of data in each partition, the hash value of the data in each partition in each physical node. Hash values of different data in a partition are different. For example, a partition A includes data 1, data 2, and data 3. A data identifier of the data 1 is a and a hash value is Hash1, a data identifier of the data 2 is b and a hash value is Hash2, and a data identifier of the data 3 is c and a hash value is Hash3.

205. The partition extension apparatus acquires a modulus value that is obtained by performing modulo operation on the hash value of the data and a quantity that is obtained after extension and is of partitions in the physical node in which the data is located.

The quantity that is obtained after extension and is of the partitions in the physical node in which the data is located is a product obtained by multiplying a quantity that is before extension and is of partitions in the physical node in which the data is located by the times for the multiplication performed by the partition extension apparatus on the quantity of the partitions in each physical node.

Exemplarily, if a hash value of data K is $Hash_k$, a quantity of partitions in a physical node in which the data K is located is N, and the partition extension apparatus performs multiplication by n times on the quantity of the partitions in each physical node, a quantity that is obtained after extension and is of partitions in the physical node in which the data K is located is n×N and a modulus value $x_k$, which is obtained by performing modulo operation on the hash value of the data K and the quantity that is obtained after extension and is of the partitions in the physical node in which the data K is located, may be obtained by calculation according to a formula $x_k = Hash_k \% (n \times N)$.

206. The partition extension apparatus determines, according to the modulus value of the data, a destination partition to which the data is to be migrated, and if the destination partition is different from the partition in which the data is currently located, migrates the data to the destination partition.

When the distributed storage system stores data, a hash value (Hash) of to-be-stored data may be calculated according to a hash function, the to-be-stored data is distributed, according to a hash value of each piece of the to-be-stored data and the total quantity of the partitions in the distributed storage system, to each partition for storage, and then the partitions in the distributed storage system are evenly distributed into each physical node.

Exemplarily, if hash values (Hash) of some data are 45, 46, 47, 48, . . . , 75 respectively, and a quantity of partitions is N, data whose results obtained from modulo operation on a hash value of each piece of the data and the quantity of the partitions are the same is distributed into a same partition, for example in a formula Hash % N, If N=3, remainders obtained from modulo operation on the hash values of the data and the quantity of the partitions are 0, 1, 2, 0, 1, 2, 0, 1, 2, 0, 1, 2 . . . 0, 1, 2, 0 respectively. The data may be distributed, according to the remainders obtained from the modulo operation, to the following three partitions: partition 1 (a remainder is 0): 45, 48, 51, 54, 57, 60, 63, 66, 69, 72, 75, partition 2 (a remainder is 1): 46, 49, 52, 55, 58, 61, 64, 67, 70, 73, and partition 3 (a remainder is 2): 47, 50, 53, 56, 59, 62, 65, 68, 71, 74.

Exemplarily, the foregoing partition 1 is used as an example to perform partition extension. In this case, the quantity N of the partitions is 3. When times n for multiplication on the quantity of the partitions is n=2, a quantity that is obtained after extension and is of partitions in a physical node in which the partition 1 is located is 2×3, and modulus values of all data in the partition 1 are $x_{45}=45\%(2\times 3)=3$, $x_{48}=48\%(2\times 3)=0$, $x_{51}=51\%(2\times 3)=3$, $x_{54}=54\%(2\times 3)=0$, $x_{57}=57\%(2\times 3)=3$. . . $x_{72}=72\%(2\times 3)=0$, and $x_{75}=75\%(2\times 3)=3$ respectively.

Specifically, if the times n for multiplication on the quantity of the partitions is n=2, the partition extension apparatus may migrate data whose modulus value is 3 to a newly added partition in a physical node in which the data is located, and retain data whose modulus value is 0 in an original partition. For example, the partition extension apparatus may migrate data corresponding to $x_{45}=45\%(2\times 3)=3$, $x_{51}=51\%(2\times 3)=3$, $x_{57}=57\%(2\times 3)=3$. . . $x_{75}=75\%(2\times 3)=3$ to a newly added partition in a physical node in which the data is located, and retain data corresponding to $x_{48}=48\%(2\times 3)=0$, $x_{54}=54\%(2\times 3)=0$... $x_{72}=72\%(2\times 3)=0$ in an original partition. Alternatively, the partition extension apparatus may migrate the data whose modulus value is 0 to a newly added partition in a physical node in which the data is located, and retain the data whose modulus value is 3 in an original partition. For example, the partition extension apparatus may migrate data corresponding to $x_{48}=48\%(2\times 3)=0$, $x_{54}=54\%(2\times 3)=0$... $x_{72}=72\%(2\times 3)=0$ to a newly added partition in a physical node in which the data is located, and retain data corresponding to $x_{45}=45\%(2\times 3)=3$, $x_{51}=51\%(2\times 3)=3$, $x_{57}=57\%(2\times 3)=3$... $x_{75}=75\%(2\times 3)=3$ in an original partition.

It should be noted that, the foregoing partition 1 is used as an example. When the times n for multiplication on the quantity of the partitions is n=3, modulus values of pieces of data in the partition 1 are $x_{45}=45\%(3\times 3)=0$, $x_{48}=48\%(3\times 3)=3$, $x_{51}=51\%(3\times 3)=6$, $x_{54}=54\%(3\times 3)=0$, $x_{57}=57\%(3\times 3)=3$... $x_{72}=72\%(3\times 3)=0$, and $x_{75}=75\%(3\times 3)=3$ respectively. The partition extension apparatus may migrate, according to modulus values 0, 3, and 6 of data, the data corresponding to the modulus values. A method for migrating, by the partition extension apparatus, data to a destination partition is similar to the method for multiplying the quantity of the partitions by two times, and details are not described in this embodiment again.

207. The partition extension apparatus adds a mapping relationship between a newly added partition and a physical node in which the newly added partition is located into a pre-stored DHT.

208. The partition extension apparatus acquires an average value of quantities that are obtained after extension and are of partitions in all the physical nodes in the distributed storage system.

After performing multiplication on the quantity of the partitions in all the physical nodes in the distributed storage system and completing migration of corresponding data in the partitions, the partition extension apparatus may acquire the average value of quantities that are obtained after extension and are of the partitions in all the physical nodes in the distributed storage system and determine, according to the acquired average value, whether the quantity of the partitions in the distributed storage system meets a quantity of partitions required by the distributed storage system for performing expansion at least once.

It should be noted that, the method for acquiring, by the partition extension apparatus, the average value of quantities that are obtained after extension and are of the partitions in all the physical nodes in the distributed storage system is similar to the method for acquiring, by the partition extension apparatus, the average value of the quantities of the partitions in all the physical nodes in the distributed storage system in this embodiment, and details are not described in this embodiment again.

209. The partition extension apparatus determines whether the average value of the quantities of the partitions after extension is less than the preset threshold; if the average value of the quantities of the partitions after extension is less than the preset threshold, perform step 210; or if the average value of the quantities of the partitions after extension is not less than the preset threshold, perform step 211.

210. The partition extension apparatus performs multiplication on the quantity of the partitions in each physical node again, where times for multiplication each time are the same.

When the average value of the quantities of the partitions after extension is less than the preset threshold, the partition extension apparatus may perform multiplication on the quantity of the partitions in each physical node again. The multiplication times for the multiplication performed by the partition extension apparatus on the quantity of the partitions in each physical node again is the same as the multiplication times for the multiplication performed for the first time by the partition extension apparatus on the quantity of the partitions.

After the partition extension apparatus performs multiplication on the quantity of the partitions in each physical node again, the method of this embodiment may further include adding, by the partition extension apparatus, the mapping relationship between the newly added partition and the physical node in which the newly added partition is located into the pre-stored DHT.

It should be noted that the partition extension apparatus may perform multiplication on the quantity of the partitions in the physical nodes at least once, times for multiplication each time are the same, and the times for the multiplication are greater than or equal to 2.

211. End the partition extension process.

It should be noted that, the partition extension apparatus may perform, according to the average value of the quantities of the partitions in the physical nodes in the distributed storage system, extension on the partitions in the physical nodes in the distributed storage system at least once. A quantity of times for partition extension is not limited in this embodiment of the present invention. A method for performing, by the partition extension apparatus, extension twice or more times on the partitions in the physical nodes in the distributed storage system is similar to the partition extension method in this embodiment, and details are not described in this embodiment again.

Further, it should be noted that, the multiplication method provided in this embodiment may not be applied only to a partition extension process of the distributed storage system, but also be applied to a multiplication process of a storage node in another storage system, and an application scope of the method of the present invention is not limited in this embodiment.

In the partition extension method provided in this embodiment of the present invention, an average value of quantities of partitions in all physical nodes in a distributed storage system can be acquired; if the average value of the quantities of the partitions is less than a preset threshold, multiplication can be performed on a quantity of partitions in each physical node; and a mapping relationship between a newly added partition and a physical node in which the newly added partition is located can be added into a pre-stored distributed hash table (DHT). Compared with the prior art in which expansibility of a distributed storage system is poor due to a small quantity of partitions in a physical node, in the partition extension method provided in this embodiment of the present invention, if a quantity of partitions is less than a preset threshold, multiplication on the quantity of the partitions can be performed during capacity expansion of the distributed storage system, thereby ensuring expansibility of the distributed storage system.

Embodiment 3

Figure 3:
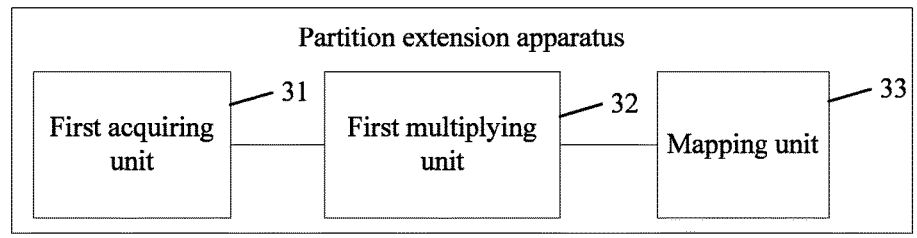
FIG. 3 is a schematic structural diagram of a partition extension apparatus according to Embodiment 3 of the present invention.

This embodiment of the present invention provides a partition extension apparatus. As shown in FIG. 3, the apparatus includes: a first acquiring unit 31, a first multiplying unit 32, and a mapping unit 33.

The first acquiring unit 31 is configured to acquire an average value of quantities of partitions in all physical nodes in a distributed storage system.

The first multiplying unit 32 is configured to: if the average value of the quantities of the partitions is less than a preset threshold, perform multiplication on a quantity of partitions in each physical node.

The mapping unit 33 is configured to add a mapping relationship between a newly added partition and a physical node in which the newly added partition is located into a pre-stored distributed hash table (DHT).

Figure 4:
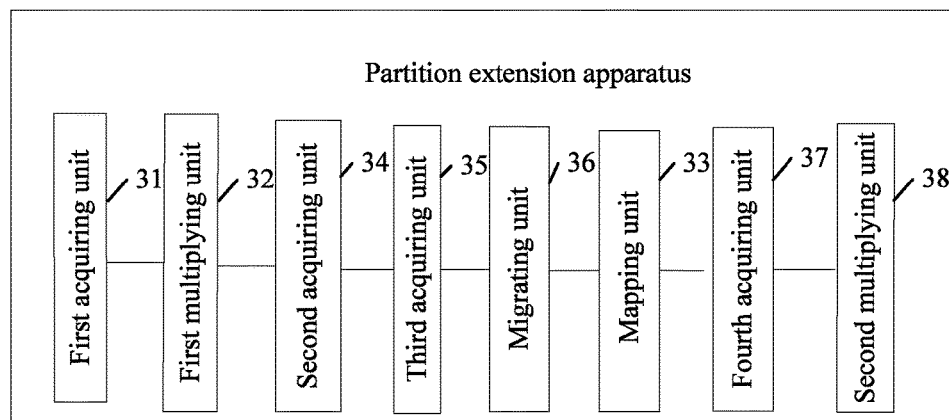
FIG. 4 is another schematic structural diagram of a partition extension apparatus according to Embodiment 3 of the present invention.

As shown in FIG. 4, the partition extension apparatus further includes: a second acquiring unit 34, a third acquiring unit 35, and a migrating unit 36.

The second acquiring unit 34 is configured to: after the first multiplying unit 32 performs multiplication on the quantity of the partitions in each physical node, acquire a hash value of data in each partition in each physical node.

The third acquiring unit 35 is configured to acquire a modulus value that is obtained by performing modulo operation on the hash value of the data and a quantity that is obtained after extension and is of partitions in the physical node in which the data is located.

The migrating unit 36 is configured to determine, according to the modulus value of the data, a destination partition to which the data is to be migrated, and if the destination partition is different from the partition in which the data is currently located, migrate the data to the destination partition.

The first multiplying unit 32 is further configured to multiply the quantity of the partitions in each physical node to at least two times the quantity of the partitions.

The partition extension apparatus further includes: a fourth acquiring unit 37 and a second multiplying unit 38.

The fourth acquiring unit 37 is configured to: after the mapping unit 33 adds the mapping relationship between the newly added partition and the physical node in which the newly added partition is located into the pre-stored distributed hash table (DHT), acquire an average value of quantities that are obtained after extension and are of partitions in all the physical nodes in the distributed storage system.

The second multiplying unit 38 is configured to: if the average value of the quantities of the partitions after extension is less than the preset threshold, perform multiplication on the quantity of the partitions in each physical node again, where times for multiplication each time are the same.

The first acquiring unit 31 is further configured to periodically acquire the average value of the quantities of the partitions in all the physical nodes in the distributed storage system, or respond to a trigger instruction of a user, to acquire the average value of the quantities of the partitions in all the physical nodes in the distributed storage system.

It should be noted that, for specific description of some function modules in the partition extension apparatus provided in this embodiment of the present invention, refer to corresponding content in the method embodiments, and details are not described in this embodiment again.

The partition extension apparatus provided in this embodiment of the present invention can acquire an average value of quantities of partitions in all physical nodes in a distributed storage system; if the average value of the quantities of the partitions is less than a preset threshold, perform multiplication on a quantity of partitions in each physical node; and add a mapping relationship between a newly added partition and a physical node in which the newly added partition is located into a pre-stored distributed hash table (DHT). Compared with the prior art in which expansibility of a distributed storage system is poor due to a small quantity of partitions in a physical node, if a quantity of partitions is less than a preset threshold, the partition extension apparatus provided in this embodiment of the present invention can perform multiplication on the quantity of the partitions during capacity expansion of the distributed storage system, thereby ensuring expansibility of the distributed storage system.

Embodiment 4

Figure 5:
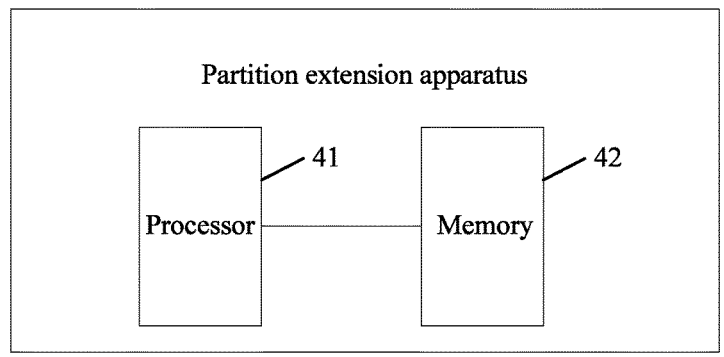
FIG. 5 is a schematic structural diagram of a partition extension apparatus according to Embodiment 4 of the present invention.

An embodiment of the present invention provides a partition extension apparatus. As shown in FIG. 5, the apparatus may include: a processor 41 and a memory 42.

The processor 41 is configured to acquire an average value of quantities of partitions in all physical nodes in a distributed storage system; if the average value of the quantities of the partitions is less than a preset threshold, perform multiplication on a quantity of partitions in each physical node; and add a mapping relationship between a newly added partition and a physical node in which the newly added partition is located into a pre-stored distributed hash table (DHT).

The memory 42 is configured to store the mapping relationship between the newly added partition and the physical node in which the newly added partition is located that is added by the processor 41.

The processor 41 is further configured to acquire a hash value of data in each partition in each physical node; acquire a modulus value that is obtained by performing modulo operation on the hash value of the data and a quantity that is obtained after extension and is of partitions in the physical node in which the data is located; and determine, according to the modulus value of the data, a destination partition to which the data is to be migrated, and if the destination partition is different from the partition in which the data is currently located, migrate the data to the destination partition.

The processor 41 is further configured to multiply the quantity of the partitions in each physical node to at least two times the quantity of the partitions.

The processor 41 is further configured to: after the mapping relationship between the new partition corresponding to the partition and the physical node in which the partition is located is added into the DHT, acquire an average value of quantities that are obtained after extension and are of partitions in all the physical nodes in the distributed storage system; and if the average value of the quantities of the partitions after extension is less than the preset threshold, perform multiplication on the quantity of the partitions in each physical node again, where times for multiplication each time are the same.

The processor 41 is further configured to periodically acquire the average value of the quantities of the partitions in all the physical nodes in the distributed storage system, or respond to a trigger instruction of a user, to acquire the average value of the quantities of the partitions in all the physical nodes in the distributed storage system.

It should be noted that, for specific description of some function modules in the partition extension apparatus provided in this embodiment of the present invention, refer to corresponding content in the method embodiments, and details are not described in this embodiment again.

The partition extension apparatus provided in this embodiment of the present invention can acquire an average value of quantities of partitions in all physical nodes in a distributed storage system; if the average value of the quantities of the partitions is less than a preset threshold, perform multiplication on a quantity of partitions in each physical node; and add a mapping relationship between a newly added partition and a physical node in which the newly added partition is located into a pre-stored distributed hash table (DHT). Compared with the prior art in which expansibility of a distributed storage system is poor due to a small quantity of partitions in a physical node, if the quantity of the partitions is less than a preset threshold, the partition extension apparatus provided in this embodiment of the present invention can perform multiplication on the quantity of the partitions during capacity expansion of the distributed storage system, thereby ensuring expansibility of the distributed storage system.

Based on the foregoing descriptions of the implementation manners, a person skilled in the art may clearly understand that the present invention may be implemented by software in addition to necessary universal hardware or by hardware only. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method comprising:
   maintaining a distributed hash table (DHT) that maps partitions to physical nodes on which the partitions are stored;
   determining that M/N is lower than a threshold wherein M is a count of all partitions identified in the DHT and wherein N is a count of physical nodes in which the M partitions are stored;
   adding a respective plurality of new partitions to each of the N nodes, based upon the determination; and
   storing a mapping relationship between the new partitions and the nodes on which they are stored in the DHT.

2. The method according to claim 1, further comprising:
   obtaining data stored in a first data node of the N data nodes;
   performing a hashing operation on the data to identify a matching partition; and
   migrating the data from the first data node to a target data node that stores the matching partition.

3. The method according to claim 2, further comprising:
   identifying the target data node using the mapping relationship.

4. A device comprising:
   a memory storage comprising instructions; and
   one or more processors in communication with the memory, wherein the one or more processors execute the instructions to:
   maintain a distributed hash table (DHT) that maps partitions to physical nodes on which the partitions are stored;
   determine that M/N is lower than a threshold wherein M is a count of all partitions identified in the DHT and wherein N is a count of physical nodes in which the M partitions are stored;
   add a respective plurality of new partitions to each of the N nodes, based upon the determination; and
   store a mapping relationship between the new partitions and the data nodes on which they are stored in the DHT.

5. The device according to claim 4, wherein the processor is further configured to:
   obtain data stored in an first data node of the N data nodes;
   perform a hashing operation on the data to identify a matching partition; and
   migrate the data from the first data node to a target data node that stores the matching partition.

6. The device according to claim 5, wherein the processor is further configured to:
   identify the target data node using the mapping relationship.

7. A non-transitory computer-readable medium storing computer instructions, that when executed by one or more processors, cause the one or more processors to perform the steps of:
   maintain a distributed hash table (DHT) that maps partitions to physical nodes on which the partitions are stored;
   determine that M/N is lower than a threshold wherein M is a count of all partitions identified in the DHT and wherein N is a count of physical nodes in which the M partitions are stored;
   add a respective plurality of new partitions to each of the N nodes, based upon the determination; and
   store a mapping relationship between the new partitions and the data nodes on which they are stored in the DHT.

8. The computer-readable medium according to claim 7, wherein the steps further comprise:
   obtain data stored in an first data node of the N data nodes;
   perform a hashing operation on the data to identify a matching partition; and
   migrate the data from the first data node to a target data node that stores the matching partition.

9. The computer-readable medium according to claim 8, wherein the steps further comprise:
   identify the target data node using the mapping relationship.

* * * * *